United States Patent [19]
Kagitani et al.

[11] Patent Number: 5,435,964
[45] Date of Patent: Jul. 25, 1995

[54] PARISON FORMING METHOD AND APPARATUS THEREFOR

[75] Inventors: Toshio Kagitani; Satoshi Ninomiya, both of Kanagawa, Japan

[73] Assignee: The Japan Steel Works, Ltd., Tokyo, Japan

[21] Appl. No.: 83,463

[22] Filed: Jun. 30, 1993

[30] Foreign Application Priority Data

Jun. 30, 1992 [JP] Japan .................................. 4-172467

[51] Int. Cl.⁶ ........................ B29C 47/20; B29C 47/92
[52] U.S. Cl. ................................. 264/514; 264/40.7; 264/515; 264/173; 264/209.2; 264/209.8; 425/133.1; 425/146; 425/381; 425/462; 425/466
[58] Field of Search .................. 264/514–515, 264/173, 40.7, 209.8, 209.2; 425/133.1, 462, 381, 466, 146, 465, 467

[56] References Cited

U.S. PATENT DOCUMENTS

| | | | |
|---|---|---|---|
| 3,801,254 | 4/1974 | Godtner | 264/515 |
| 4,097,214 | 6/1978 | Hsu | 425/466 |
| 4,171,195 | 10/1979 | Klein et al. | 425/466 |
| 4,302,170 | 11/1981 | Goron | 264/515 |
| 4,731,216 | 3/1988 | Topolski | 264/515 |
| 4,802,833 | 2/1989 | Shapler | 264/515 |
| 4,874,305 | 10/1989 | McGill et al. | 264/173 |
| 4,940,403 | 7/1990 | Hirschberger | 425/466 |
| 5,112,546 | 5/1992 | Comfort | 264/40.7 |
| 5,114,333 | 5/1992 | Hirschberger | 425/466 |
| 5,133,911 | 7/1992 | Kagitani | 264/515 |
| 5,204,120 | 4/1993 | Hirschberger | 425/132 |
| 5,252,268 | 10/1993 | Ohno | 264/515 |
| 5,281,126 | 1/1994 | Terada et al. | 425/532 |

Primary Examiner—Jeffery R. Thurlow
Attorney, Agent, or Firm—Sughrue, Mion, Zinn, Macpeak & Seas

[57] ABSTRACT

A parison molding method and its apparatus in which at least two kinds of materials are used, and the layer formation and dispersion are uniform in the weld part and in the circumferential direction. In the parison molding method and its apparatus, molten resin at a weld part within a parison head is discharged out of the parison head by way of a flow control valve.

7 Claims, 4 Drawing Sheets

PARISON FORMING METHOD AND APPARATUS THEREFOR

BACKGROUND OF THE INVENTION

1. Field of the Invention

The present invention relates to a parison molding apparatus, and more particularly to a method and an apparatus for molding a parison by using a mixture containing a main resin material and auxiliary resin material consisting of at least two kinds of additional materials, such as polyamide and adhesive resin. More specifically, the apparatus and method of the present invention are improved in that the structure of layer and dispersion of the auxiliary resin are uniform in a circumferential direction of the parison and at a weld portion of the parison.

2. Prior art

There are many methods and apparatuses for molding a parison by using a mixture of different kinds of materials. Of those methods and apparatuses, the apparatus as shown in FIGS. 4 through 6 is most widely used.

In FIG. 4, reference numeral 1 designates a parison head of the accumulator type coupled with a nozzle 3 of an extruder 2. A tubular manifold 4, which is formed in the parison head 1, communicates with the nozzle 3.

The manifold 4 includes an accumulator chamber 7 defined by a piston 6, which is vertically moved by a cylinder 100. A tapered core 9 is located under the accumulator chamber 7. The tapered core 9 is connected to a rod 8, which is vertically movable along the axis of the parison head 1. The thickness of a parison 11, which is discharged through a discharge port 10, is controlled by the vertical movement of the tapered core 9. The discharge port 10 communicates with the accumulator chamber 7.

In the parison molding apparatus thus constructed, molten resin extruded from the extruder 2 is supplied to the manifold 4 through the nozzle 3. In the manifold 4, the molten resin bifurcates, and the bifurcated molten resin flows along the wall 4a of the manifold 4 in the directions of arrows in FIG. 5, and joins each other at a portion located in opposition to the nozzle 3, thereby forming a weld part 5. Then, the piston 6 is pushed upward, and the molten resin is accumulated in the chamber 7.

When the piston 6 is pushed downward through the cylinder 100, the molten resin stayed in the accumulator chamber 7 is extruded out of the chamber through a discharge port 10, in the form of the parison 11.

Another type of the parison molding apparatus, not shown, has been used by some manufacturers. In the apparatus, the parison head 1 is of the double flow type, which has two layers, the inner layer and the outer layer, causing each weld part in different phases.

The conventional parison molding apparatus and its methods have the following disadvantages because of its construction.

In the conventional structure, since the manifold 4 consists of a ring-like closed path, the molten resin extruded through the nozzle 3 from the extruder bifurcates, and the bifurcated molten resin join each other in the weld part and are bonded together in the radial direction of the parison head 1 (FIG. 5). When the container thus flow molded is filled with liquid, e.g., gasoline, there is a possibility that the gasoline permeates through the weld part 5 of the container.

Attempt has been made to prevent the gasoline permeation. In the attempt, the main resin material is mixed with an additional material for preventing such a permeation. An auxiliary material is obtained, for example, by mixing polyamide and the adhesive resin. The main resin material and, polyamide and adhesive resin, which are mixed in the ratio of 7:3. The molten resin bifurcates to flow in two directions along the wall of the manifold, as shown in FIG. 6. As the molten resin goes away from the nozzle, the extruding pressure acting on the molten resin becomes weaker. Accordingly, the large amounts of auxiliary resin material is likely to stay in a portion closer to the nozzle. In other words, less amounts of the auxiliary resin material reach the weld portion.

Since the extruding pressure is low in the weld portion, the amounts of the extruded additional materials are small. The amounts of the additional materials, which are dispersed in the form of film and are used for preventing the liquid penetration, are too small to form the layer. In a container, for example, a gasoline tank, which is molded by blow molding under this condition, the weld part thereof exhibits poor barrier property. Accordingly, the gasoline easily to penetrate into the weld part, causing gasoline leakage.

The prior art parison head of the double layer type requires a complicated structure. In this sense, it is unsuitable for the mass production manufacturing.

For example, two methods for molding plastic gasoline (fuel) tanks for cars have been known. In the first method, a) main resin material for keeping the shape of the tank and for securing the required strength (rigidity), b) auxiliary resin material for increasing the barrier property or improving the gasoline permeability, and c) adhesive for bonding the materials a) and b) above together are molded by a multi-layer blowing mold method (e.g. Unexamined Japanese Patent Publication Hei. 2-286219). In the second method, the materials a), b), and c) are previously mixed and molded by a blowing mold method. To carry out the first method, a plural number of extruders are required. This results in a complicated machine structure and operation, and expense of the machine.

SUMMARY OF THE INVENTION

In view of the forgoing problems, the present invention has an object to provide a parison molding method and its apparatus in which at least two kinds of materials consisting of a main resin and an auxiliary resin which consists of e.g., polyamide and adhesive resin, are used, and the layer formation and dispersion are uniform at the weld part and in the circumferential direction thereof.

To achieve the above object, there is provided a parison molding method for molding a parison by supplying molten resin containing at least two kinds of materials from an extruder into a parison head, in which the molten resin positioned at a weld portion is discharged out of the parison head through a flow control valve.

There is also provided a parison molding apparatus which molds a parison by supplying molten resin containing at least two kinds of materials, from an extruder into a parison head, said parison molding apparatus comprises a flow control valve, for controlling an amount of a molten resin, mounted on the parison head.

In the parison molding apparatus and its method of the present invention, the molten resin supplied from the extruder through the nozzle to the parison head bifurcates and the bifurcated molten resin flows move along the wall of the manifold. The bifurcated molten resin flows are joined together at the portion opposite to the nozzle, and the molten resin flows to the outside of parison head through the flow control valve opposite to the nozzle. Accordingly, such a phenomenon that the molten resin flows meet each other causing a weld portion does not take place. The film- or layer-like additional materials are substantially uniformly dispersed in the main resin material, over the entire circumferential path of the manifold. If the molded-product formed by introducing air into the parison thus constructed, is filled with gasoline, for example, little permeation of gasoline takes place in the weld part. The molded product is durable and reliable.

DETAILED DESCRIPTION OF THE PREFERRED EMBODIMENTS

Figure 1:
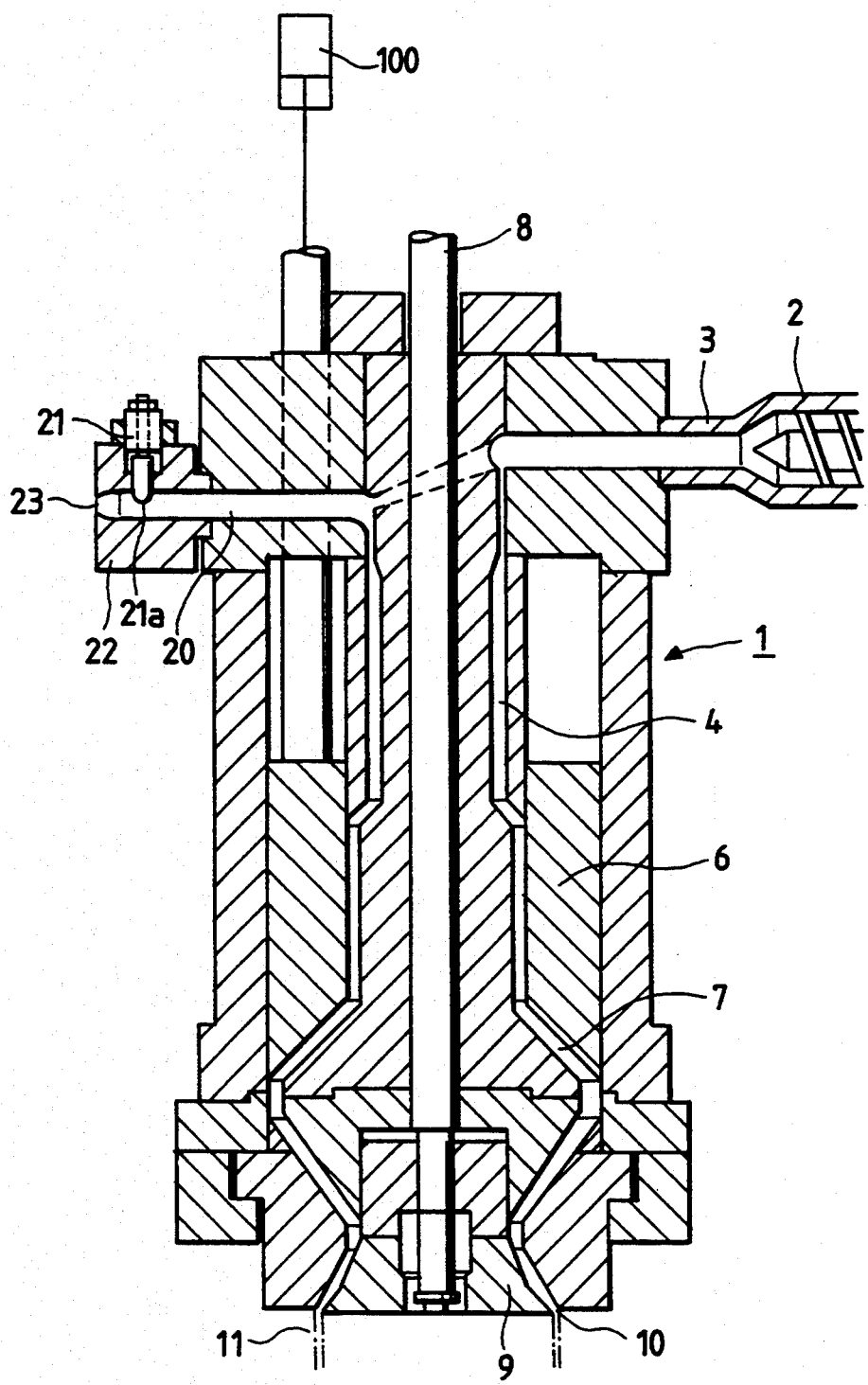
FIG. 1 is a longitudinal sectional view showing a parison molding apparatus according to an embodiment of the present invention.

The preferred embodiments of a parison molding method and its apparatus according to the present invention will be described with reference to the accompanying drawings.

Throughout the drawings used in the embodiment description to follow, like reference numerals are used for designating like or equivalent portions in the drawings used for the prior art description already given.

Figure 2:
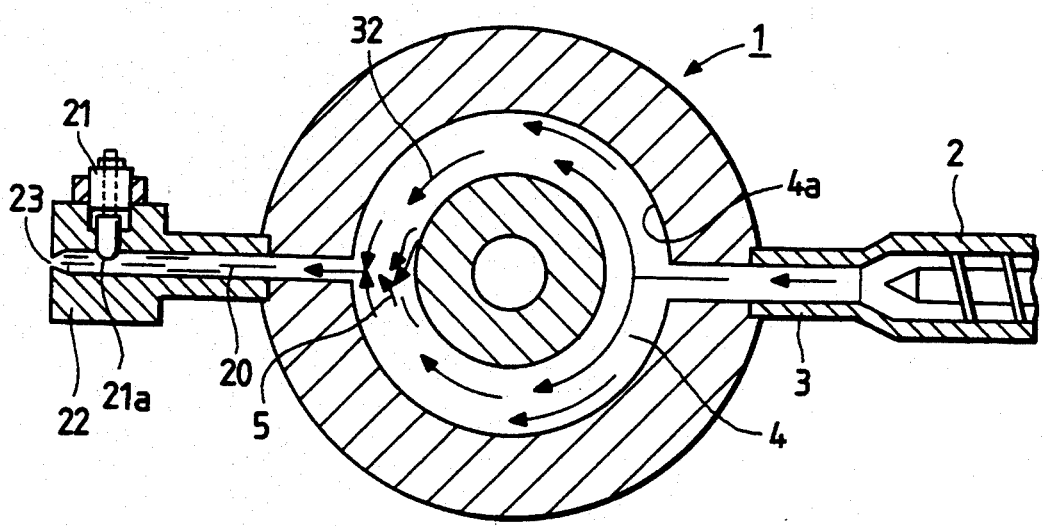
FIG. 2 is a cross sectional view showing the parison molding apparatus of FIG. 1.
Figure 3:
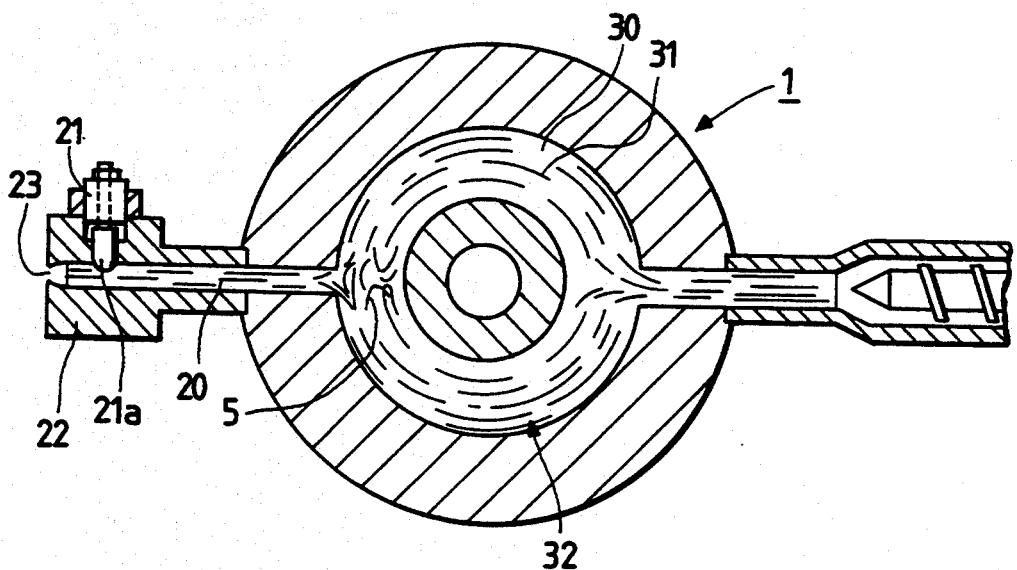
FIG. 3 is an explanatory diagram for explaining the operation of the parison molding apparatus of FIG. 1.
Figure 4:
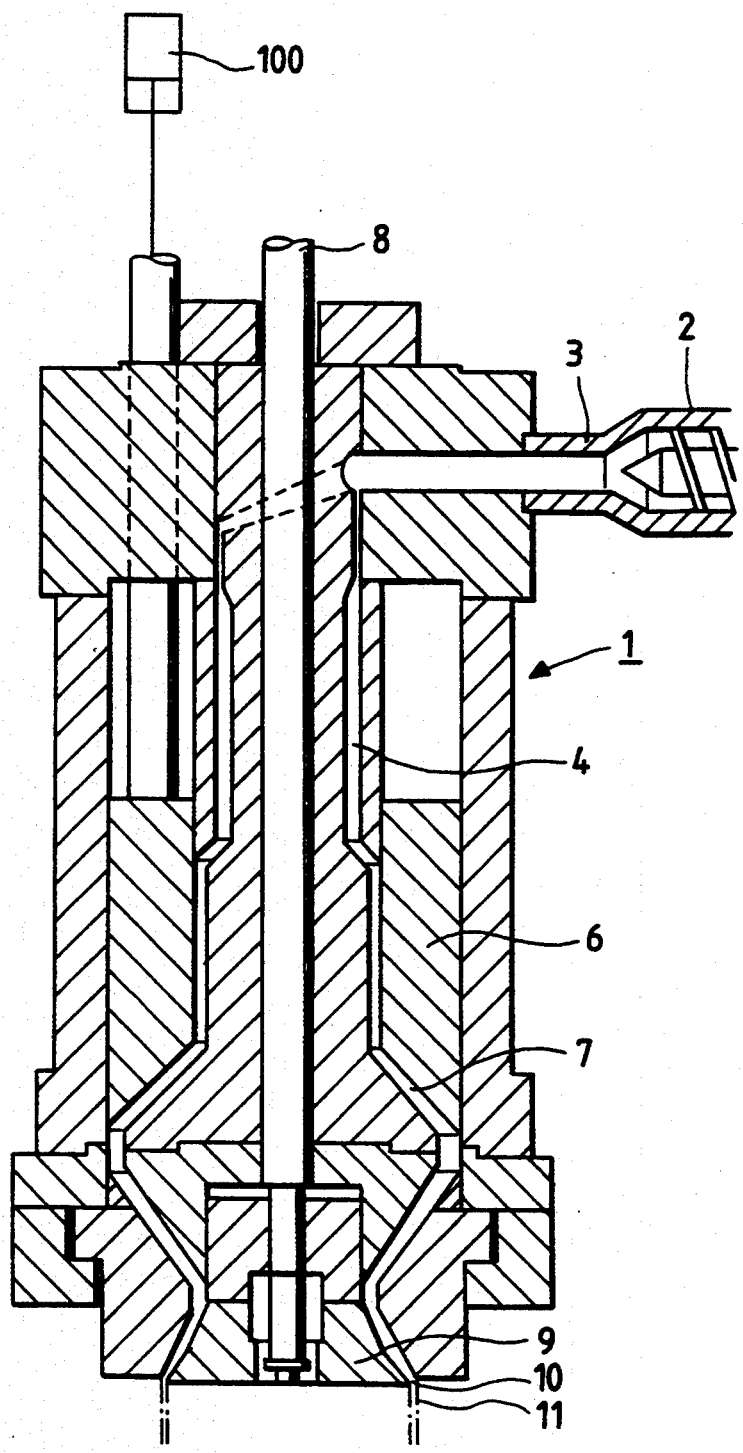
FIG. 4 is a longitudinal sectional view showing a conventional parison molding apparatus.
Figure 5:
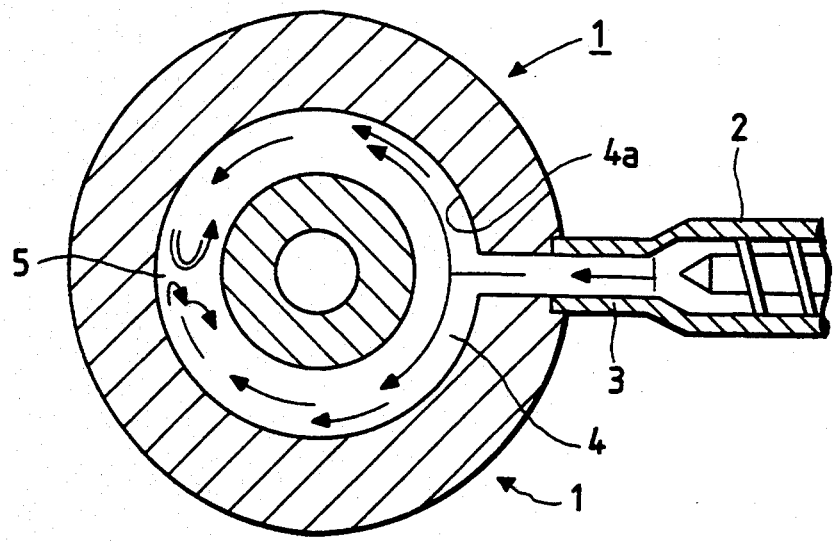
FIG. 5 is a cross sectional view showing the parison molding apparatus of FIG. 4.
Figure 6:
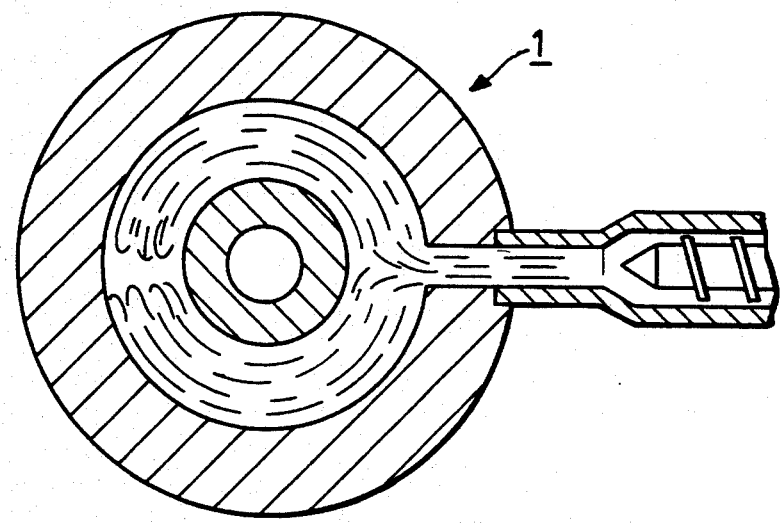
FIG. 6 is an explanatory diagram for explaining the operation of the parison molding apparatus of FIG. 4.

In FIGS. 1 through 3 showing a parison molding apparatus of the invention, FIG. 1 is a longitudinal sectional view showing the parison molding apparatus, FIG. 2 is a cross sectional view showing the parison molding apparatus of FIG. 1, and FIG. 3 is an explanatory diagram for explaining the operation of the parison molding apparatus.

In FIG. 1, reference numeral 1 designates a parison head of the accumulator type coupled with a nozzle 3 of an extruder 2. A tubular manifold 4, which is formed in the parison head 1, communicates with the nozzle 3.

A block 22 is attached to the outside of a specific location in the upper part of the parison head 1, which corresponds to the weld part 5. A top of the block 22 includes a flow control valve 21 with a valve body 21a and a hole or discharge passage 20 connecting to the manifold 4. The hole 20 is terminated to form a discharge port 23. The valve body 21a is used to open and close the hole 20 at a location near the discharge port 23.

The manifold 4 includes an accumulator chamber 7 defined by a piston 6, which is vertically moved by a cylinder 100. A tapered core 9 is located under the accumulator chamber 7. The tapered core 9 is connected to a rod 8, which is vertically movable along the axis of the parison head 1. The thickness of a parison 11, which is discharged through a discharge port or die slit 10, is controlled by the vertical movement of the tapered core 9. The discharge port 10 communicates with the accumulator chamber 7.

In the construction described above, a molten resin 32 is obtained by mixing a main resin material 30, e.g. HMWPE (high molecular weight polyethylene) with a mixture 31 containing a mixture of additional materials which are different in kind from the main resin material 30. The additional materials are in a film or layer shape e.g., polyamide and adhesive resin. As shown in FIG. 2, molten resin 32 extruded from the extruder 2 is supplied to the manifold 4 through the nozzle 3. In the manifold 4, the molten resin bifurcates, and the bifurcated molten resin flow along the wall 4a of the manifold 4 in the directions of arrows in FIG. 2, and join each other in a portion located in opposition to the nozzle 3, thereby forming a slight weld part 5, and then is discharged through the flow control valve 21. The piston 6 is pushed upward, and the molten resin is accumulated in the chamber 7.

An experiment was conducted. In the experiment, the ratio of the resin discharged through the flow control valve 21 to exterior to the resin extruded, by the extruder 2, into the parison head was variously changed; the resin of 0%, 0.5%, 2% and 13% were discharged from the discharge port 23.

When the molten resin of 0% is discharged, the film-like layers of the mixture 31 were not formed in the weld part 5, as shown in FIG. 3.

The formation of the film-like layer in the weld part was observed when the flow control valve 21 opened. In the cases of 0.5% and 2%, a slight formation of the film-like layers was observed, but was comparable with that in the case of 0%. The ratio was increased to 13%. The substantially uniform formation of the film-like layer of the additional material 31 was confirmed as the same as another portions. From the experiments, it was concluded that the optimum ratio of the molten resin discharged out of the flow control valve was within the range of approximately 10% to 15%. Within this range, the film- or layer-like mixture 31 is formed in the main resin material 31 substantially uniformly over the entire circumferential path of the manifold. Accordingly, when the resultant product is filled with liquid, for example, gasoline, little permeation of the liquid in the weld part takes place.

In the parison head thus constructed, in a state that the molten resin 32 containing two different kinds of materials is stayed in the accumulator chamber 7, when the piston 6 is pushed down, a parison 11 is pushed out of the parison head through the discharge port 10. The thickness of the parison is defined by the tapered core 9.

In the parison 11 thus formed, the layer- or film-like mixture 31 which block the permeation of the contained liquid are contained in main resin material 30. As a matter of course, the film-like mixture 31 are present also in the weld part 5. Accordingly, when the products are applied to gasoline tanks, no gasoline will leak from the weld part of the product. It is evident that the molten resin consists of more than two kinds of materials, although the embodiment as mentioned above uses only two kinds of materials.

The parison molding method and its apparatus, which have thus far been described, have the following beneficial effects.

In the process of extruding the molten resin containing at least two kinds of materials such as the main resin material and the mixture, the specific amount of the molten resin is released from the parison head by the flow control valve, which is provided at the location corresponding to the weld part 5. Accordingly, no separation of the molten resin takes place at the weld part 5. The mixture 31 for preventing the permeation of the molten resin is formed also in the weld part 5. The parisons free from the permeation problem can readily be manufactured.

Further, the structure of the parison head may be made simple. No molten resin stagnation takes place. Accordingly, when the resin remarkably sensitive to heat is used, the parison can be formed in an easy way.

The resin discharged out of the parison head by way of the flow control valve may be used again for the same purpose. In this case, it is processed into pellets or powder. In this respect, the present invention contributes to resources.

What is claimed is:

1. A parison molding apparatus for molding a parison, comprising:
   a parison head;
   a manifold formed in said parison head, said manifold defining a ring-shaped path and forming an accumulator chamber, said manifold being communicated with a nozzle of an extruder, said extruder extruding a molten resin to said accumulator chamber;
   a piston, mounted on said accumulator chamber, driven by a cylinder;
   a core connected to a rod which is positioned along an axis of said parison head in a vertical direction, said core cooperating with said parison head to define a dies slit, said die slit communicating with said accumulator chamber;
   a discharge passage formed in said parison head and including a first end connected to said ring-shaped path of said manifold, and a second end terminating in a discharge port; and
   a flow control valve disposed for opening and closing said discharge passage thereby to control an amount of said molten resin which is discharged through said discharge passage and out of said discharge port, whereby when said molten resin extruded from said extruder is supplied to said manifold, said molten resin bifurcates and the bifurcated flows of molten resin flow along the ring-shaped path of said manifold and join each other at a location proximate to said discharge passage, and then said molten resin is discharged through said flow control Valve and out of Said discharge port.

2. A parison molding apparatus as claimed in claim 1, wherein said molten resin contains at least two kinds of materials.

3. A parison molding apparatus as claimed in claim 2, wherein said molten resin contains a main resin material and a mixture.

4. A parison molding apparatus as claimed in claim 3, wherein said mixture includes polyamide and an adhesive resin 5. A parison molding method for molding a parison, comprising the steps of:
   supplying molten resin containing at least two kinds of materials including a main resin material and a mixture from a nozzle of an extruder into a parison head;
   flowing said molten resin along a wall of a manifold of said parison head, said manifold defining a ring-shaped path so that said molten resin bifurcates into two flows;
   joining said bifurcated molten resin flows at a weld portion of the molten resin opposite to said nozzle; and
   discharging said molten resin out of said parison head through a discharge passage controlled by a flow control valve, said discharge passage communicating with a portion of said manifold proximate to the weld portion of the molten resin.

6. A parison molding method for molding a parison as claimed in claim 5, wherein said mixture includes polyamide.

7. A parison molding method for molding a parison as claimed in claim 6, wherein said mixture further includes adhesive material for enhancing a bonding characteristic of said two materials.

* * * * *